United States Patent [19]

Kaltenthaler et al.

[11] Patent Number: 4,756,548
[45] Date of Patent: Jul. 12, 1988

[54] LEVEL CONTROL ARRANGEMENT FOR VEHICLES HAVING AIR SPRINGS

[75] Inventors: Wolfgang Kaltenthaler, Wennigsen; Karl-Heinrich Schonfeld, Seelze, both of Fed. Rep. of Germany

[73] Assignee: WABCO Westinghouse Fahrzeugbremsen GmbH, Hanover, Fed. Rep. of Germany

[21] Appl. No.: 917,571

[22] Filed: Oct. 10, 1986

[30] Foreign Application Priority Data

Dec. 5, 1985 [DE] Fed. Rep. of Germany ....... 3542974

[51] Int. Cl.⁴ .................. B60G 13/06; B60G 9/00; B60G 17/04; B60G 11/26
[52] U.S. Cl. .................. 280/702; 280/711; 280/714
[58] Field of Search ............... 280/707, 6.1, 6 H, 6 R, 280/702, 711, 714

[56] References Cited

U.S. PATENT DOCUMENTS

| | | | |
|---|---|---|---|
| 4,327,936 | 5/1982 | Sekiguchi | 280/711 |
| 4,465,297 | 8/1984 | Yamahara | 280/711 |
| 4,504,081 | 3/1985 | Shimizu et al. | 280/714 |
| 4,558,886 | 12/1985 | Straub | 280/702 |
| 4,568,093 | 2/1986 | Shimizu et al. | 280/702 |
| 4,607,861 | 8/1986 | Eisenberg et al. | 280/702 |

FOREIGN PATENT DOCUMENTS

| | | |
|---|---|---|
| 0160466 | 4/1985 | European Pat. Off. . |
| 1430557 | 4/1969 | Fed. Rep. of Germany . |
| 1914696 | 10/1969 | Fed. Rep. of Germany . |
| 1947550 | 7/1970 | Fed. Rep. of Germany . |
| 1630764 | 7/1971 | Fed. Rep. of Germany . |
| 2012203 | 9/1971 | Fed. Rep. of Germany . |
| 2116058 | 10/1972 | Fed. Rep. of Germany . |
| 3031453 | 3/1981 | Fed. Rep. of Germany . |
| 1358920 | 3/1974 | United Kingdom . |
| 2081655 | 7/1980 | United Kingdom . |

*Primary Examiner*—Richard A. Bertsch
*Attorney, Agent, or Firm*—J. B. Sotak

[57] ABSTRACT

A level control arrangement for motor vehicles having air springs which are functionally responsive to the vehicle load. A predetermined distance of the vehicle frame from the vehicle axis can be maintained by charging or discharging the air springs. The control arrangement includes a safety valve which can be controlled by the pressure in the air springs. When the vehicle is overloaded, or if a malfunction occurs in the control apparatus of the level control arrangement, the safety valve limits the pressure in the air springs to a preselected maximum safe pressure.

9 Claims, 4 Drawing Sheets

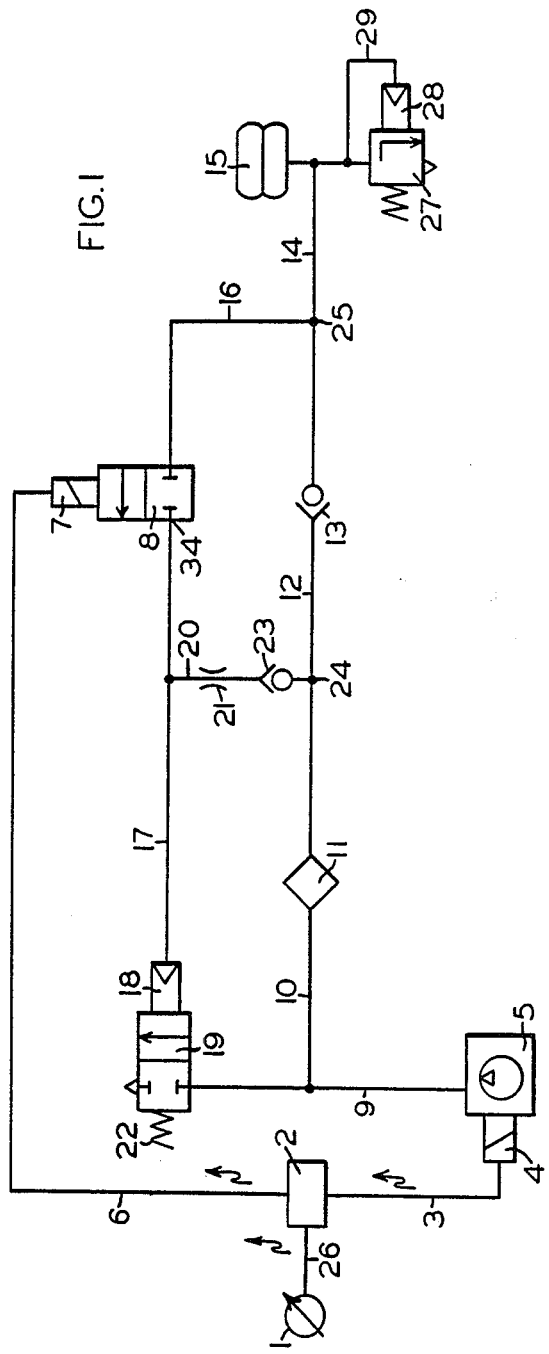
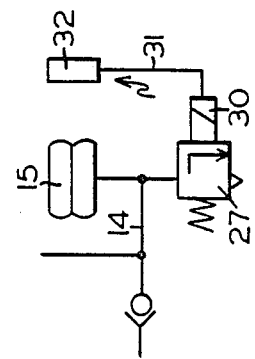
FIG.1
FIG.2

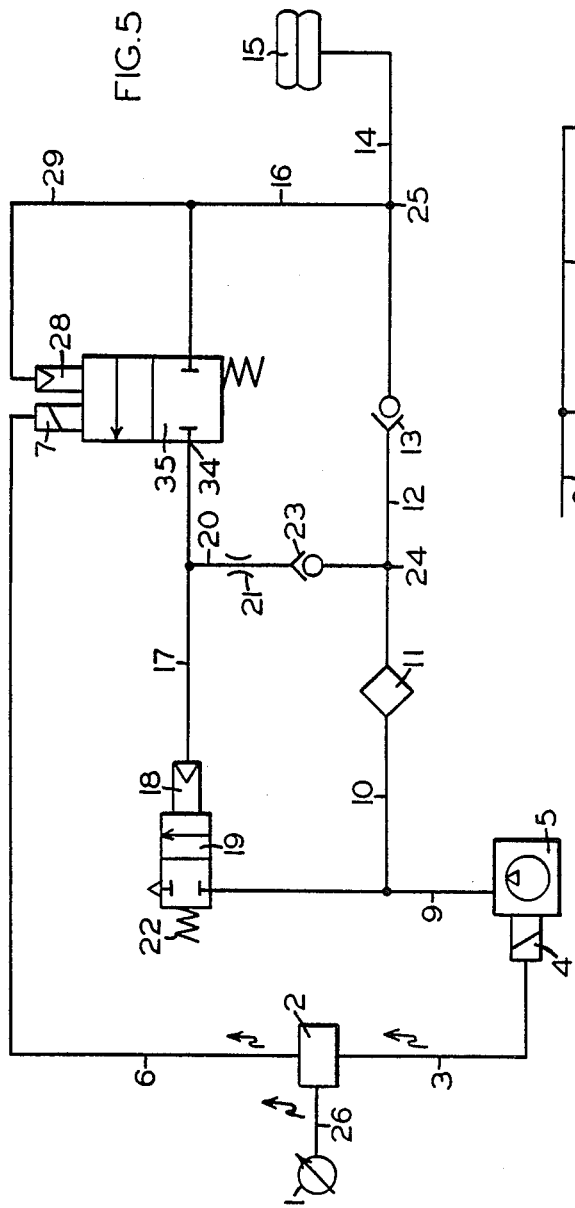
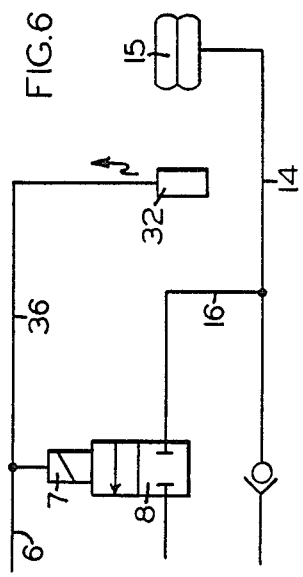

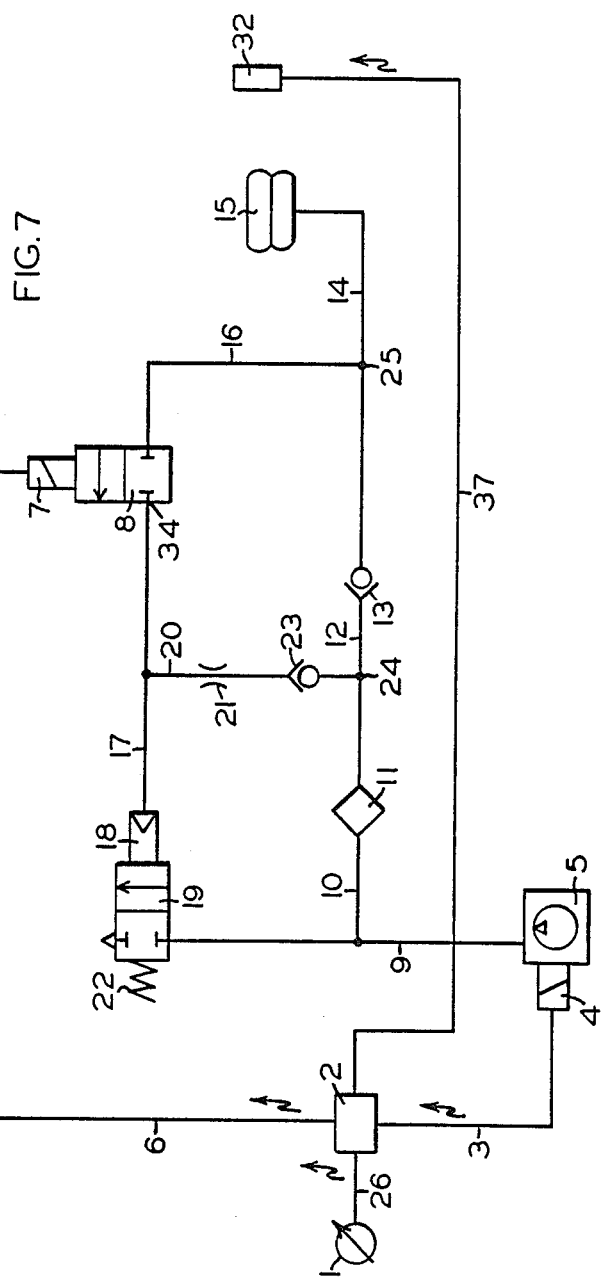

LEVEL CONTROL ARRANGEMENT FOR VEHICLES HAVING AIR SPRINGS

FIELD OF THE INVENTION

This invention relates to a level control arrangement for vehicles having air springs, and more particularly to a self-leveling vehicle height-adjusting system for maintaining the distance between the vehicle frame and the vehicle axle by charging and discharging the air suspension springs in accordance with the load sustained by the vehicle and including a safety valve for relieving the pressure in the air springs when it exceeds a predetermined value.

BACKGROUND OF THE INVENTION

On vehicles with air suspensions, a load-dependent level control system is generally used. The amount of air in the pneumatic bellows of the air spring suspension system is thereby regulated as a function of the vehicle load so that a predetermined distance between the vehicle frame and the vehicle axle is always maintained.

A previous vehicle height control system of the present type is shown and described in U.S. Pat. No. 4,354,693. Such a prior system consists essentially of the following parts:

A distance measurement device measures the distance between the vehicle frame and the vehicle axle which varies as the vehicle is loaded or unloaded. The measure data is compared by means of an electronic evaluation circuit having a command value which is equivalent to the standard level of distance. When a deviation occurs, the standard level is re-established by pressurizing or evacuating the air springs. To fill up the air springs, the electronic system switches an air spring valve between the pressure supply source and the air springs to the open position, and the pressure supply source causes air to be conveyed into the air springs until the electronic system recognizes the standard level reported by the distance measurement device. The air pressure is then shut off and the air spring valve closed. The discharging of the air springs takes place so that the electronic system opens the air spring valve and causes a second evaluation valve to open to the atmosphere. The air springs are then discharged to the atmosphere until the electronic system closes both valves when it recognizes the standard level.

However, the systems of these previous types have the disadvantage that even when the vehicle frame descends as the result of an excessive overload, i.e., an overload of the vehicle, the pressure supply source is activated by the distance measurement device and the electronic system to re-establish the standard level. Thus, the pressure supply source continues to convey air into the bellows of the air springs, on account of the overloading of the vehicle, even though the air springs already exhibit a correspondingly excessively high air pressure. Accordingly, the air springs are filled to this extent with excess pressure and are also loaded during operation by dynamic pressure peaks, which can lead to damages to the air spring bellows. A switching malfunction caused, for example, by a defective distance measurement device and/or failure of the electronic system, is capable of causing the pressure supply source not to be shut off, which can also lead to an uncontrolled pressure increase in the air spring bellows, and thus result in the above-mentioned damage.

OBJECTS AND SUMMARY OF THE INVENTION

An object of this invention, therefore, is to improve a system of the type described above, so that during any load status of the vehicle, and/or when a switching malfunction occurs in the level control equipment, a preselected maximum pressure in the bellows of the air springs cannot be exceeded.

A further object of the present invention is to provide a new and improved vehicle height control system in which air springs vary the distance between the frame and axle of the vehicle by causing a pressure supply source to charge the air springs when the distance is less than a preselected amount and for causing the air springs to be discharged when the distance exceeds the preselected amount and when the air spring pressure exceeds a predetermined value due to a malfunction in the system.

The invention has the advantage that, when the vehicle is overloaded, the vehicle frame can come into contact with a fixed stop on the vehicle frame, and in this state, a "low level" is recognized by the distance measurement device to cause a subsequent pressure supply source switching so that a specified preselected maximum pressure in the bellows of the air spring is not exceeded.

Another advantage of this invention is to provide a level control system which is equipped with an air dryer, which, when the air springs are filled, is operated in the drying phase and when the air springs are discharged, i.e., when the vehicle frame descends, is operated in the regeneration phase.

The air which flows out of the air springs when the vehicle is overloaded can then also be conducted to the air dryer for regeneration of the air dryer. This results in a maximum utilization of the air flowing out of the air springs for the regeneration of the air dryer when the vehicle frame descends or when the vehicle is overloaded.

In accordance with the present invention, there is provided a level control arrangement for vehicles having air springs by which a vehicle frame is suspended in relation to at least one vehicle axis, comprising a control device connected between a pressure supply source and a valve means to raise and lower the vehicle frame by charging and exhausting the air spring, the valve means includes a safety valve which is controlled by pressure corresponding to the pressure of the air spring so that the pressure in the air spring can be reduced.

BRIEF DESCRIPTION OF THE DRAWINGS

The above objects and other attendant features and advantages of the present invention will be more readily understood from the following detailed description when considered in conjunction with the accompanying drawings in which:

FIGS. 1 and 2 show a vehicle level control system having an overload safety valve for discharging excessive pressure in the air suspension spring into the atmosphere.

FIGS. 5 and 6 show a vehicle level control system similar to FIG. 1, except that it has an air spring valve which operates as an overload safety valve.

FIG. 7 shows a vehicle level control arrangement similar to FIG. 1 with an overload apparatus controlled by the electronic system of the level control arrangement.

DETAILED DESCRIPTION OF THE INVENTION

Figure 3:
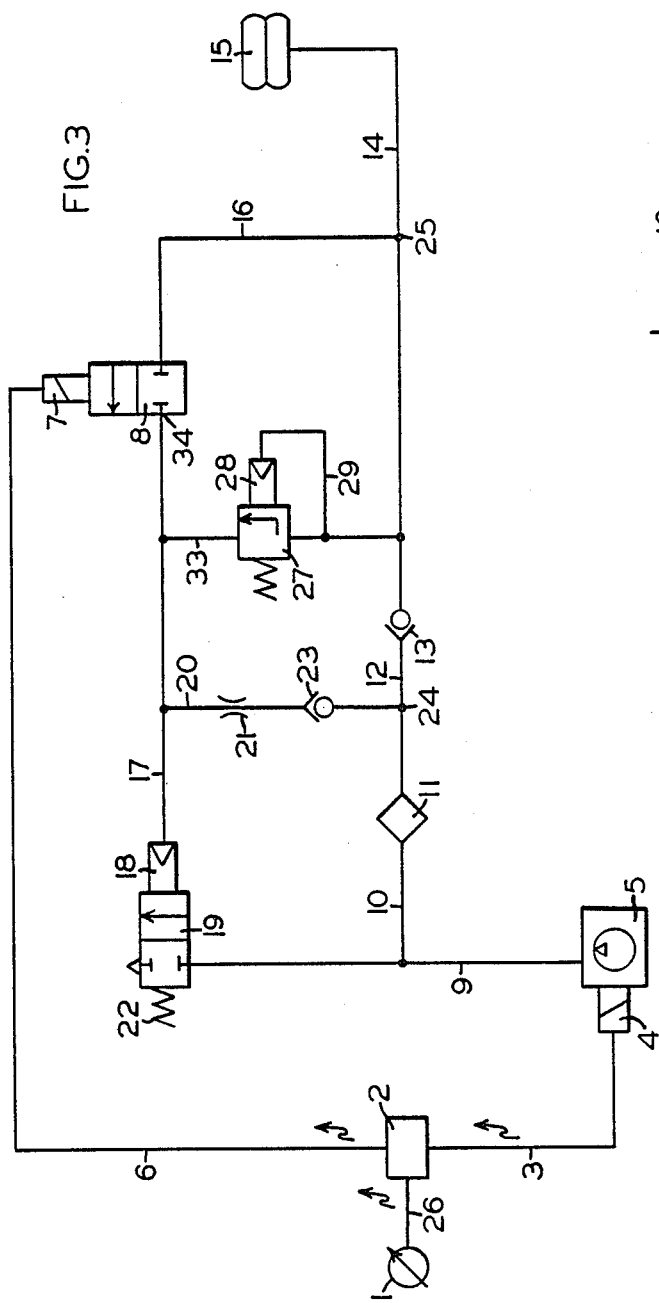
FIGS. 3 and 4 show a vehicle level control arrangement similar to FIG. 1, except that the overload safety valve is integrated into the pressure supply circuit.

Referring now to the drawings, and particularly to FIG. 1, an air spring 15 is schematically illustrated and symbolically represents all the other air springs of the vehicle. The air spring 15 is shown connected to a suitable pressure supply source 5 which supplys compressed air to the spring bellows. The air springs are connected by a first pneumatically-controlled multi-way valve 19 which may be exhausted into the atmosphere. The first multi-way valve 19 has a pneumatic-control input portion 18 which is controlled by a second multi-way valve 8. The first multi-way valve 8 functions as the air spring valve and can be pressurized with a control pressure which is determined by the pressure in the air spring 15. A biasing spring 22 provides a return force which acts in the opposite direction to the pressure conveyed to the pneumatic control input 18.

It will be noted that a suitable air dryer 11 is connected via a first check valve 13 which permits the flow of compressed air to the air spring 15, but blocks the flow of air from the air spring 15. A second check valve 23 permits the flow of air from the air spring 15 to the air dryer 11 via the second multi-way valve 8. Upstream of the second check valve 23, there is provided a choke or a throttle valve 21. The second check valve 23 is connected with a pressure supply output port 34 of the second multi-way valve 8.

The pneumatic control input portion 18 of the first multi-way valve 19 is connected to the throttle 21 via a line 20 and is connected to the pressure supply output port 34 of the second multi-way valve 8.

A height or distance measuring device 1 senses and measures the distance or the level of the vehicle frame from the vehicle axis. The measuring device 1 is connected by means of an electrical lead or line 26 to an integrated electronic control unit 2. The electronic control unit 2 includes an evaluation circuit having a desired stored value which corresponds to a preselected standard level. The height or level which is measured by the distance measuring device 1 is compared with the standard level stored in the evaluation circuit. Thus, the actual height or given distance between the sprung and unsprung portions of the vehicle can be varied as necessary. The electronic control unit 2 conveys electrical control signals corresponding to the results of the level comparison over an electrical line 3 which is connected to an electric control terminal 4 of the pressure supply source 5. The electrical control signals are also conveyed to line 6 which is connected to an electric control terminal 7 of the multi-way valve 8.

If the actual measured level value is less than the preselected stored standard level value, then the pressure supply source 5 is switched on or activated by the electronic control unit 2. Thus, compressed air is conducted to the air spring 15 over pressure lines 9 and 10, through the air dryer 11, over a pressure line 12, through the check valve 13, and over a pressure line 14. The compressed air is conveyed to the air spring 15 until the standard level is reached, at which time the electronic control unit 2 turns off or deactivates the pressure supply source 5.

Conversely, when the actual measured value is above the preselected stored standard level value and with the pressure medium source 5 turned off, the air spring 15 is vented into the atmosphere until the standard pressure level is reached. Under this condition, the electronic control unit 2 then shifts the second multi-way air spring valve 8 from a closed position as shown in FIG. 1 to the open position. The air pressure in the air spring 15 flows through the pressure lines 14, 16, 17 to the pneumatic control input 18 of the first multi-way valve 19. Thus, the valve 19 is shifted from its closed position to its opened position to vent air spring pressure to the atmosphere.

It will be seen that the pressure line 20 is connected to the air dryer 11 and the second multi-way valve 8 so that the air spring 15 is then connected via the pressure lines 10,9 and the first multi-way valve 19 to the atmosphere. Now when the distance measurement device 1 signals that the standard level has been attained, electronic control unit 2 switches the multi-way valve 8 back to its closed position.

Thus, the pressure line 9 is closed during the discharge of air from the spring 15 and shuts off the outlet of pressure supply source 5. The pressure at the control input 18 of the multi-way valve 19 is then equalized via the connection lines 17, 20, the filter and lines 11, 10, 9 and the multi-way valve 19 to the atmospheric pressure until the biasing force of tension of the spring 22 causes the multi-way valve 19 to move to its closed position.

It will be seen that, during the charging phase, the check valve 23, which is located in the line 20 between the throttle 21 and the air dryer 11, closes the flow to the control connection terminal 18 of the multi-way valve 19. The multi-way valve 19 is prevented from being switched into the position in which the pressure line 9 is connected with the atmosphere during the charging operational phase.

It will be observed that there is a line connection such as a tee joint 24 which is interposed between the pressure line 12 and the pressure line 20. The pressure lines 12, 14, 16 are connected to one another by means of a line connection fitting or tee joint 25.

As shown, the check valve 13 is located in the line 12 between the tee pipes 24, 25 and is adapted to close the connection from the air spring 15 to the air dryer 11 during the exhaust phase.

The air dryer 11 dries the air during the charging or filling of the air spring 15 and purges the dessicant of moisture during the discharging or exhausting of the air spring 15, namely, in regeneration mode. An air dryer which is suitable for this purpose is shown and described in U.S. Pat. No. 3,592,563.

It will be seen that the choke 21 is located in the pressure line 20 and is effective during the exhaust phase to throttle or reduce the pressure of the air which flows to the air dryer 11, but unthrottled or full control pressure is fed to the control input 18 of valve 19.

The valve arrangement to exhaust the air spring 15 into the atmosphere advantageously includes a third or ancillary multi-way valve 27 which acts as a safety valve against an overpressure in the air spring. The multi-way valve 27 may preferably be controlled with the pressure which corresponds to the pressure in the air spring 15. The exhausting of the air spring 15 via the third multi-way valve 27 occurs as soon as pressure in the air spring 15 has reached a predetermined or preselected critical pressure level which is above a normal maximum operating pressure.

Such excessive or critical pressure level which is above the normal maximum operating pressure can occur when the vehicle is overloaded. The overload condition, like the normal loading process, within the specified allowable load limits, causes a descent of the vehicle frame. The distance measurement device 1 records this change of the level, but does not recognize that this level change is due to an overloading of the vehicle. The distance measurement device 1 consequently triggers the electronic system 2 and causes compressed air to flow from the pressure supply source 5 into the air spring 15 to re-establish the standard or normal level of the vehicle frame. The air pressure in the air springs 15 caused by overloading of the vehicle is thereby increased even further.

Depending on the degree or relative intensity of overloading, a predetermined critical pressure level can be reached in the air spring 15 which can lead to the damage of the bellows of the air spring 15. This critical pressure level can specifically be reached during vehicle operation if, on account of overloading, the pressure in the air spring 15, already increased above the maximum operating pressure, is increased even further by short-term dynamic pressure peaks.

A pressure level in the air spring 15 which exceeds the specified maximum operating pressure can also be achieved by a malfunction or failure in the height or level regulation system. For example, if a malfunction occurs in the distance measurement device 1 and/or in the electronic system 2, the pressure supply source 5 will not shut or cut off in time.

In practice, the multi-way valve 27 which is connected with the air spring 15 has a switching point which lies below the critical damaging pressure level of the air spring 15 so that a reduction of the pressure in the air spring 15 is initiated or triggered before damage occurs to the air spring 15 under the conditions described above.

As shown in FIG. 1, the multi-way valve 27 is connected via the pressure line 14 to the air spring 15. The multi-way valve 27 has a pneumatic control input 28 which can be pressurized with the pressure prevailing in the air spring 15 via a pressure line 29.

Referring now to another embodiment which is illustrated in FIG. 2, the multi-way valve 27 may include an electrical control input 30 which is connected via an electrical line 31 with a pressure sensor 32. The pressure sensor 32 responds and measures the pressure which is constantly present in the air spring 15. When a specified critical pressure level in the air spring 15 is reached, the multi-way valve 27 causes the air spring 15 to be connected to the atmosphere. It will be appreciated that, located between the pressure sensor 32 and the electrical control input 30, there is an appropriate transducer which converts the pressure signal from the pressure sensor 32 into a current signal for the electrical control input 30.

Referring now to FIG. 3, there is shown a multi-way valve 27 which has the same structural features as the valve 27 of FIG. 1. As shown, valve 27 is connected via the line 14 to the air spring 15. The air spring 15 is also connected via the multi-way valve 27 and a pressure line 33 to the pressure line leading to the pressure output 34 of the second multi-way valve 8 and to the control input 18 of the first multi-way valve 19.

Such an arrangement has the advantage that the air spring 15 can be connected via the first multi-way valve 19 to atmosphere by the distance measurement device 1 when the measured value is above the standard height or level. The air which flows out of the air spring 15 via the multi-way valve 27 is also used for regeneration of the air dryer 11.

Figure 4:
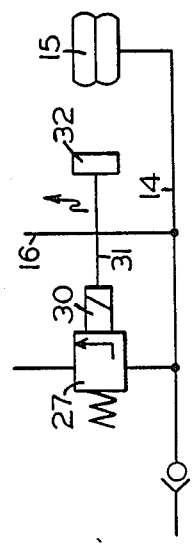

Referring now to FIG. 4, there is shown the multi-way valve 27 which is structurally equivalent to the valve 27 of FIG. 3. In place of the pneumatic control input 28, there is shown an electrical control input 30, which is connected via the electrical line 31 with the pressure sensor 32 which measures the pressure in the air spring 15. The operation of the apparatus is substantially the same as that of FIG. 2.

Another embodiment is illustrated in FIG. 5. It will be noted that the third multi-way valve 27 and the second multi-way valve 8 of the arrangement illustrated in FIG. 1 are combined to form a single or unitary multi-way valve 35 having an electrical control input 7 and a pneumatic control input 28. The air spring 15 is connected via the multi-way valve 35 to the pneumatic control input 18 of the first multi-way valve 19 and via the air dryer 11 with the outlet to atmosphere of the first multi-way valve 19. The electrical control input 7 is activated by the vehicle height or control sensing apparatus which sense the descent of the vehicle frame by the distance measurement device 1 and the electronic control unit 2. The pneumatic control input 26 is activated by a pressure sensed of the above-mentioned overload control line 29 by a pressure which corresponds to the pressure in the air spring 15. Both controls are independent of one another so that the multi-way valve 35 is switched from the closed position into the open position, whereupon a connection is established from the air spring 15 to the control input 18. Thus, the outlet of the multi-way valve 19 connects the air dryer 11 to the atmosphere.

In viewing FIG. 6, it will be seen that the electrical control input 7 of the second multi-way valve 8 is connected via the electrical line 6 to the electronic control unit 2 which is activated by the distance measurement device 1 and is also connected via an electrical line 36 to the pressure sensor 32. In order to activate the control input 7 by the electronic control unit 2 (which is illustrated schematically) or by the pressure sensor 32, the multi-way valve 8 is switched from the closed position into the open position, whereupon the exhausting of the air spring 15 takes place in the manner as illustrated in FIG. 5.

The embodiment illustrated in FIG. 6 has an advantage over the embodiments illustrated in FIGS. 1 to 5 in that it is simpler and economical. It will be seen that the second multi-way valve 8 includes only one electrical control input 7 which can be activated both by the distance measurement device 1 and by the pressure sensor 32.

According to the embodiments shown in FIGS. 1 to 6, the pressure supply source 5 is not normally turned off during an overload of the vehicle since the distance measurement device 1 indicates a low height level, and so the pressure source 5 would continue to supply compressed air to the air spring 15. Nevertheless, the pressure supply source 5 is protected against any undesirable excessive pressure in the system because the pressure supply source 5 and the air spring 15 are connectable to atmosphere via the first multi-way valve 19 which is activated by the excessive pressure occurring in the air spring 15.

Referring now to the embodiment illustrated in FIG. 7, it will be seen that the pressure sensor 32 is connected via an electrical line 37 to the electronic control unit 2. In a circuit which compares the command value and the instantaneous value of the electronic control unit 2, the pressure indicated by the pressure sensor 32, which appears in the air spring 15, is compared with a specified command value. This command value corresponds to a maximum pressure that should appear in the air spring 15 during the overloading of the vehicle at which time the electrical control input 7 of the second multi-way valve 8 is activated via the electrical line 6 of the electronic system 2, to switch the second multi-way valve 8 from the closed position into the open position.

When this command value is reached, an OR gate or logic element in the electronic control unit 2 causes the electrical control input 4 to activate the pressure supply source 5 via an electrical line 3 to turn off the pressure supply source 5. The signal thereby emitted by the distance measurement device 1 and sent to the electronic control unit 2, which corresponds to a low height level resulting from the overloading of the vehicle, is suppressed in the electronic control unit 2.

The apparatus shown in FIG. 7 has the advantage that energy can be conserved by shutting off the pressure supply source 5 during an overload phase.

The apparatus described above for the protection against an overload beyond a specified maximum pressure in the air spring 15 can also be utilized in level control systems which are equipped with an air dryer. The air flowing out of the air spring 15 is then as shown in FIGS. 1 and 2 conducted directly into the atmosphere.

Instead of utilizing a multi-valve 27 as illustrated in FIGS. 1 and 2 the air spring 15 can be protected against an undesirable pressure increase by using a conventional pressure limiting valve which may be inserted in the pressure line between the pressure supply source 5 and the air spring 15. Such a pressure limiting valve would shut off the pressure supply source 5 from the air spring 15 if a specified pressure occurred on its secondary side which corresponds to the pressure appearing in the air spring 15. The pressure supply source 5 would then be connected to atmosphere for the duration of the overload of the air spring 15. Of course, with such an apparatus, the pressure in the air spring would increase in proportion to the overload of the vehicle, until the vehicle frame came into contact with a fixed stop on the vehicle frame, but a further increase in pressure in the air spring 15 would not be possible, because then the pressure supply source 5 would be switched by the pressure limiting valve to atmosphere.

Thus, the present invention has been described in such full, clear, concise and exact terms as to enable any person skilled in the art to which it pertains to make and use the same, and in which the best mode contemplated of carrying out this invention has been set forth. We state that the subject matter, which we regard as being our invention, is particularly pointed out and distinctly claimed in what is claimed. It will be understood that variations, modifications, equivalents and substitutions for components of the above specifically-described embodiment of the invention may be made by those skilled in the art without departing from the spirit and scope of the invention as set forth in the appended claims.

What we claim is:

1. A level control arrangement for vehicles having air springs by which a vehicle frame is suspended in relation to at least one vehicle axis, comprising a control device connected between a pressure supply source and a valve means to raise and lower the vehicle frame by charging and exhausting the air spring, the valve means includes a safety valve which is controlled by pressure corresponding to the pressure of the air spring so that the pressure in the air spring can be reduced, and the valve means includes a first multi-way valve which is open to the atmosphere and a second multi-way valve which connects the air spring and the first multi-way valve; the second multi-way valve includes a control input, which can be activated as a function of the distance of the vehicle frame from the vehicle axis; the air spring can be connected with the pressure supply source for charging via on air dryer operated in drying operation; and the air spring can be connected via the air dryer in regeneration operation and the first multi-way valve with the atmosphere, so that the air spring can be connected by the safety valve for exhaustion via the air dryer and the first multi-way valve with the atmosphere.

2. The level control arrangement according to claim 1, wherein the first multi-way valve is designed so that it can be controlled pneumatically, whereby the pneumatic control input can be pressurized via the second multi-way valve or via the safety valve with a pressure corresponding to the pressure of the air spring.

3. The level control arrangement according to claim 1, wherein the safety valve is connected by a pressure line to the inside of the air spring and a pressure line leading from a pressure output of the second multi-way valve to a control input of the first multi-way valve.

4. The level control arrangement according to claim 1, wherein the safety valve and the second multi-way valve are combined into one multi-way valve, and the combined multi-way valve can be controlled as a function of the distance of the vehicle frame from the vehicle axis as well as by a pressure corresponding to the pressure in the air spring.

5. The level control arrangement according to claim 4, wherein the combined multi-way valve includes an electrical control input and a pneumatic control input whereby the electrical control input can be activated as a function of the distance of the vehicle frame from the vehicle axis and the pneumatic control input can be activated by a pressure corresponding to the pressure in the air spring.

6. The level control arrangement according to claim 1, wherein the second multi-way valve includes an electrical control input which can be activated by a pressure sensor which measures the pressure in the air spring.

7. The level control arrangement according to claim 6, wherein the electrical control input of the second multi-way valve can be activated by a pressure sensor which measures the pressure in the air spring by means of a circuit which compares the measured valve with the command valve in an electronic system.

8. The level control arrangement according to claim 7, wherein the electronic system includes an OR element by means of which the pressure supply source can be disconnected when the electrical control input is activated by the pressure sensor via the electronic system.

9. A level control arrangement for vehicles having air springs by which a vehicle frame is suspended in relation to at least one vehicle axis comprising a control device connected between a pressure supply source and a valve means to raise and lower the vehicle frame by charging and exhausting the air spring, the valve means includes a safety valve which is controlled by pressure corresponding to the pressure of the air spring so that the pressure in the air spring can be reduced, and the valve means includes a pressure relief valve which is located in the pressure line between the pressure supply source and the air spring which can be controlled with a pressure corresponding to the pressure of the air spring and by means of which the pressure line between the pressure supply source and the air spring can be closed toward the air spring.

* * * * *

UNITED STATES PATENT AND TRADEMARK OFFICE
CERTIFICATE OF CORRECTION

PATENT NO. : 4,756,548
DATED : July 12, 1988
INVENTOR(S) : Wolfgang Kaltenthaler & Karl-Heinrich Schonfeld It is certified that error appears in the above-identified patent and that said Letters Patent are hereby corrected as shown below:

Column 8, line 13, delete "on" and insert --an-- line 54, delete "valve" and insert --value-- line 55, delete "valve" and insert --value--

Signed and Sealed this

Thirteenth Day of December, 1988

Attest:

DONALD J. QUIGG

*Attesting Officer*   *Commissioner of Patents and Trademarks*